US007720789B2

(12) United States Patent
Seeds et al.

(10) Patent No.: US 7,720,789 B2
(45) Date of Patent: May 18, 2010

(54) SYSTEM AND METHOD OF MEMBER UNIQUE NAMES

(75) Inventors: Glen Seeds, Ottawa (CA); David Cushing, Osgoode (CA); Henk Cazemier, Spencerville (CA)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 11/767,252

(22) Filed: Jun. 22, 2007

(65) Prior Publication Data

US 2008/0005063 A1 Jan. 3, 2008

Related U.S. Application Data

(63) Continuation-in-part of application No. 11/473,616, filed on Jun. 23, 2006.

(51) Int. Cl.
*G06F 17/30* (2006.01)
(52) U.S. Cl. .................................. 707/1; 707/2; 707/101
(58) Field of Classification Search ................. 707/1–6, 707/100–102, 104.1
See application file for complete search history.

(56) References Cited

U.S. PATENT DOCUMENTS

| 6,768,986 | B2 * | 7/2004 | Cras et al. ....................... 707/2 |
| 7,139,766 | B2 * | 11/2006 | Thomson et al. ............. 707/101 |
| 2003/0033437 | A1 | 2/2003 | Fischer et al. |
| 2005/0010550 | A1 * | 1/2005 | Potter et al. ..................... 707/1 |
| 2006/0048048 | A1 | 3/2006 | Welcker et al. |

OTHER PUBLICATIONS

Riccardo Torlone, et al.; "Design and Development of a Tool for Integrating Heterogeneous Data Warehouses"; Data Warehousing and Knowledge Discovery Lecture Notes in Computer Science; LNCS, Springer-Verlag, BE; vol. 3589, pp. 105-114, 2005.

(Continued)

*Primary Examiner*—Debbie Le
(74) *Attorney, Agent, or Firm*—Shumaker & Sieffert, P.A.

(57) ABSTRACT

A member unique name (MUN) structure and MUN translation system and method are provided. The MUN structure comprises a canonical business key for uniquely identifying a member across different dimensional data sources within a business enterprise and at least one of a dimension reference for defining the context in which the remaining portions of the MUN exist or a data source identifier (DSI) for uniquely identifying a member within a dimensional data source that implements its own unique member identifiers. The MUN translation system comprises a translation selection module for selecting a MUN transformation and a collection of MUN transformations for transforming a MUN structure of a first data source into a MUN structure of the second data source. The collection of MUN transformations comprises at least one of a different source technology OLAP to OLAP transformation for transforming a third OLAP MUN to a fourth OLAP MUN or a Dimensionally Modelled Relational (DMR) to OLAP transformation for transforming a DMR MUN to an OLAP MUN. The third OLAP MUN and fourth OLAP MUN are of different source technologies. The method comprises the steps of selecting a MUN transformation and transforming a MUN of a first data source into a MUN of the second data source. The step of transforming comprises at least one of the steps of transforming a first OLAP MUN to a second OLAP MUN, the first OLAP MUN and second OLAP MUN are of different source technologies or transforming a DMR MUN to an OLAP MUN.

10 Claims, 12 Drawing Sheets

OTHER PUBLICATIONS

Cabibbo L, et al.; "On the Integration of Autonomous Data Marts"; Scientific and Statistical Database Management, 2004; Proceedings, 16th International Conference on Santorini Island, Greece, June 21-23, 2004; Piscataway, NJ, USA, pp. 223-231.

Luca Cabibbo, et al.; "An Architecture for Data Warehousing Supporting Data Independence and Interoperability"; International Journal of Cooperative Information Systems; vol. 10, No. 3, 2001, pp. 1-22.

Chuck Ballard, et al.; "Data Mart Consolidation: Getting Control of Your Enterprise Information"; IBM.COM/REDBOOKS; 2005, pp. 67-116.

Cheung, et al.; "A Metadatabase-Enabled Executive Information System (Part B): Methods for Dynamic Multidimensional Data Analysis"; Decision Support Systems, Elsevier Science Publishers; Amsterdam, NL, vol. 42, No. 3, March 6, 2006, pp. 1599-1612.

Cheung, et al.; "A Metadatabase-Enabled Executive Information System (Part A): A Flexible and Adaptable Architecture"; Decision Support Systems, Elsevier Science Publishers; Amsterdam, NL, vol. 42, No. 3, April 11, 2006, pp. 1589-1598.

Vetterli T, et al.; "Metadata Standards for Data Warehousing: Open Information Model vs. Common Warehouse Metadata"; SIGMOD Record, Special Interest Group on the Management of Data, New York, NY; vol. 29, No. 3, Sep. 2000; pp. 68-75.

Do, H. H.; Rahm, E.: "On Metadata Interoperability in Data Warehouses"; Technical Report 01-2000. Department of Computer Science; University of Leipzig; March 2000, pp. 1-21, XP002458232.

Canadian Office Action from related Canadian Application No. 2,551,033 dated Aug. 27, 2009 (4 pages).

Canadian Office Action from corresponding Canadian Application No. 2,592,561 dated Jun. 29, 2009 (4 pages).

* cited by examiner

SYSTEM AND METHOD OF MEMBER UNIQUE NAMES

CROSS-REFERENCE TO RELATED APPLICATION

This patent application is a continuation-in-part of co-pending U.S. patent application Ser. No. 11/473,616 filed Jun. 23, 2006, the contents of the foregoing application are incorporated herein by reference in their entirety.

FIELD OF THE INVENTION

The invention relates generally to data access middleware and in particular to a system and method of member unique names.

BACKGROUND

Within large corporate data warehouses, it is common practice to assign unique identifiers, or business keys, to logical entities to facilitate the sharing and integration of data across the entire corporation. Different data source technologies provide their own mechanisms that codify the concept of business keys within their products.

A business key is unique within a given context. For example, subsidiaries have identifiers unique within a corporation. In addition, contexts can be hierarchical in nature: Offices are unique within the context of cities, which in turn are unique within their state and country.

Different data source technologies provide their own mechanisms that assign business keys to data entities (referred to simply as entities in this document). Entities are uniquely identified in different ways, depending on the technology used to store or report on the data:

- Relational databases use the unique combination of the value of one or more columns in one or more relational tables to identify entities. This concept also applies to dimensionally-modeled star or snow flake schemas, such as those typically used for data warehousing applications.
- Online analytic processing (OLAP) technologies identify entities (a.k.a. members in OLAP terminology) by member unique names (MUNs). Each entity in an OLAP database is assigned a MUN that is unique within a specific scope, typically that of the entire database, referred to as a cube in OLAP technology. The format of MUNs changes from one OLAP technology to another.
- Business intelligence (BI) applications that author reports or analyses (list reports, cross tabs, charts) must be able to refer to entities as part of their report/analysis specifications, notably in the case of calculations and filter expressions.

To provide the expected inter-report behavior (e.g., drill-through), we must be able to convey entity values from one report/analysis (the source report) to another (the target report) while retaining the context (the business keys) of the values. In a business environment that uses a single, static data source storage technology, this is a simple task, because the storage technology applies a single convention to assign keys.

Similarly, in master/detail reports, in which a set of master records are associated with zero or more detail records, it is typical for the master and detail records to be returned by separate queries where the context for the detail query is provided by one or more values from the master query. Once again, if all data is stored in a single, static data source, the identity of each entry is easy to maintain.

Finally, the context provided by business keys is critical to reports that may be run more than once. For example, consider the common situation where a BI application involves authoring a report, saving it, and executing it at a later date. In a business environment, it is possible for the data source upon which saved reports were authored to change over time, but the saved reports must remain unaffected by changes to the underlying data source.

Challenges to the Current Paradigm

In a single-data-source environment, passing entities among reports, or even across the same report executed multiple times, is usually a simple proposition, because each entity typically has one and only one identifier or MUN. However, most business environments use multiple, dynamic data source technologies to contain their corporate data. When data is stored in multiple data source technologies, and when that data may change over time, reporting on reports presents several major challenges:

1. A single entity may have multiple identifiers or MUNs, most likely one per data source technology.
2. Data within the databases typically change over time as entities are added, deleted, and modified over time. Similarly, within a dimensional data source (relational or OLAP), an entity's position within a hierarchical ordering of entities may change over time. These changes can (and often do) cause changes to the entities' business keys and identifiers. In the presence of changing data, a saved report may contain references to entities that have changed over time and as a consequence, their identifier may have changed.
3. Disparate technologies (i.e., relational vs. OLAP) typically do not share data across the technologies very easily if at all.

To execute a report or analysis in the context of another report or analysis (e.g., drill-through or master/detail) requires that an application convert an entity's business key between its representations in the different data source technologies. This is the only way to ensure that each report references the correct entity. This is an unmanageable burden for BI applications.

In the presence of changing data, as in an active business, a saved report may contain references to entities that have changed over time and as a consequence, their business key may also have changed. Requiring BI applications to resolve these entity references is again an unmanageable burden.

Finally, requiring applications authored against one data source technology to accommodate changes to another referenced data source technology is exceptionally difficult, and is also not a reasonable expectation of most businesses.

Upgrade Challenges

In an environment of multiple data source technologies, it is common for an entire data source technology to be replaced by another technology. In such occurrences, it is necessary for all BI applications authored against the original data source technology to continue to return the correct data without modification. This means all existing reports and analyses must be modified to accommodate the new data source, which is not a simple task, and is frequently prohibitively expensive for most businesses.

An alternative to this approach is to employ a piece of middleware that maintains a map of an entity's single, corporate identifier and all of its representations in all of the supported data source technologies. Though this does address the problem, it introduces its own set of problems:

The map must be constantly maintained and updated.

The map will grow over time as it may never be possible to remove old/deleted entity references.

Resolving an entity reference, or returning an entity reference in a result set, which occurs with a high frequency, requires a map lookup and imposes sometimes severe performance penalties:

Even if each lookup in the map incurs only a small performance penalty, this overhead quickly becomes unacceptable with the large volumes associated with business applications.

If the map is stored in memory, it often consumes a very large portion of available memory.

If the map is stored even partially on disk, the impact on performance is increased.

SUMMARY OF THE INVENTION

The invention describes

A variable-format, data source-agnostic Portable Member Unique Name (PMUN), to be used by BI applications. The PMUN includes model metadata, a data source-specific identifier, and an optional canonical identifier.

A component that is able to construct a PMUN for both dimensional modeled relational (DMR) data sources and online analytic processing (OLAP) data sources.

A component that is able to convert a PMUN created for one data source into a PMUN for any supported data source technology, and vice versa, without the maintenance or memory problems of a MUN map or the necessity of an application containing entity identifier mapping logic. This component makes use of the business key values embedded within the PMUNs.

By use of the invention, entity identifiers saved in BI reports and analyses remain valid regardless of changes to the data within a data source or to changes in the actual underlying data source technology. In addition, BI applications are able to execute a report in the context of another report, independent of the data source technology upon which either report or analysis is authored.

In accordance with an embodiment of the present invention, there is provided a member unique name (MUN) structure for use in translating a dimensional member reference of a first report to a dimensional member reference of a second report. The MUN structure comprises a canonical business key for uniquely identifying a member across different dimensional data sources within a business enterprise and at least one of a dimension reference for defining the context in which the remaining portions of the MUN exist or a data source identifier (DSI) for uniquely identifying a member within a dimensional data source that implements its own unique member identifiers.

In accordance with another embodiment of the present invention, there is provided a member unique name (MUN) translation system for translating a dimensional member reference in a first report to a dimensional member reference in a second report. The MUN translation system comprises a translation selection module for selecting a MUN transformation and a collection of MUN transformations for transforming a MUN structure of a first data source into a MUN structure of the second data source. The collection of MUN transformations comprises at least one of a different source technology OLAP to OLAP transformation for transforming a third OLAP MUN to a fourth OLAP MUN or a DMR to OLAP transformation for transforming a DMR MUN to an OLAP MUN. The third OLAP MUN and fourth OLAP MUN are of different source technologies.

In accordance with another embodiment of the present invention, there is provided a method of translating a dimensional member reference in a first report to a dimensional member reference in a second report. The method comprises the steps of selecting a MUN transformation and transforming a MUN of a first data source into a MUN of the second data source. The step of transforming comprises at least one of the steps of transforming a first OLAP MUN to a second OLAP MUN, the first OLAP MUN and second OLAP MUN being of different source technologies or transforming a DMR MUN to an OLAP MUN.

In accordance with another embodiment of the present invention, there is provided a memory containing computer executable instructions that can be read and executed by a computer for caring out a method of translating a dimensional member reference in a first report to a dimensional member reference in a second report. The method comprises the steps of selecting a MUN transformation and transforming a MUN of a first data source into a MUN of the second data source. The step of transforming comprises at least one of the steps of transforming a first OLAP MUN to a second OLAP MUN or transforming a DMR MUN to an OLAP MUN. The first OLAP MUN and second OLAP MUN are of different source technologies.

BRIEF DESCRIPTION OF THE DRAWINGS

An embodiment of the patent disclosure will now be described by way of example only with reference to the following drawings in which.

DETAILED DESCRIPTION

Figure 1:
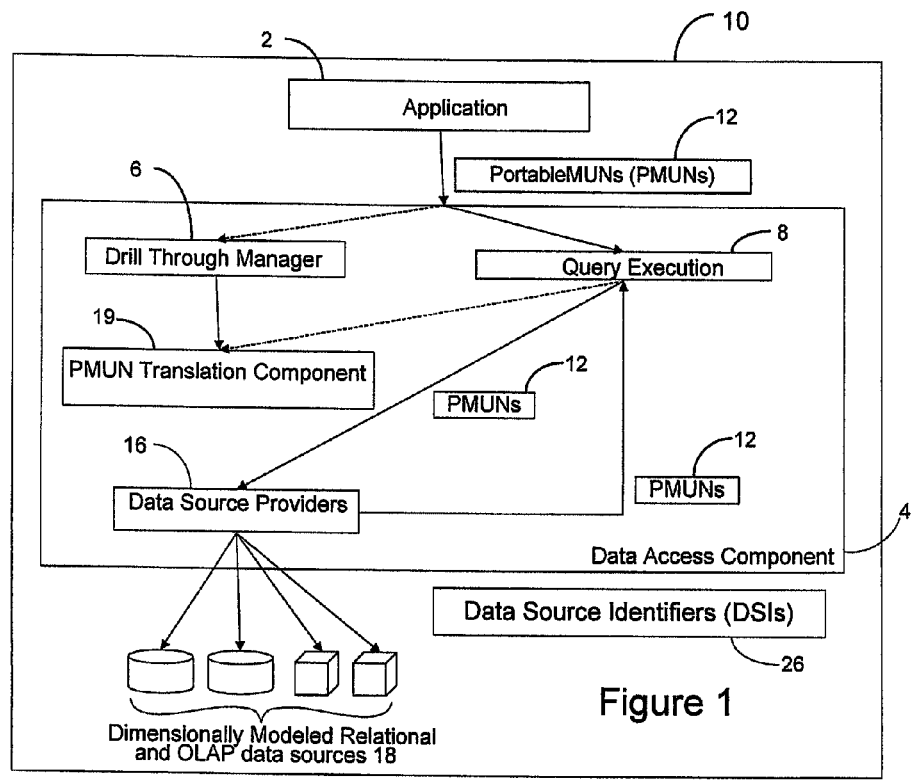
FIG. 1 shows in a diagram an example of an environments in which one or more applications are used to author reports against multiple dimensionally-modeled data source technologies, in accordance with an embodiment of the present invention.

A system and method of the present invention will now be described with reference to various examples of how the embodiments can best be made and used. For convenience, like reference numerals are used throughout the description and several views of the drawings to indicate like or corresponding parts, wherein the various elements are not necessarily drawn to scale.

In one embodiment, the invention describes a data-agnostic Portable Member Unique Name (PMUN) format and a component that is able to convert PMUNs created in the context of one data source technology into either a PMUN applicable to another data source technology or to a canonical format applicable to all data source technologies.

The invention may be used within, but not limited to, environments in which one or more applications are used to author reports against multiple dimensionally-modeled data source technologies, and where:

- The data source technology upon which a saved report or analysis is authored can change.
- Report-to-report drill through occurs where different data source technologies are used in the two reports (source and target).
- Master/detail reports in which the corresponding master and detail queries are authored against different data source technologies.
- Business entities represented within a data store may be added, deleted, changed, or re-positioned within the dimensional data space.

FIG. 1 shows in a diagram an example of an environment 10 in which one or more applications are used to author reports against multiple dimensionally-modeled data source technologies, in accordance with an embodiment of the present invention. A business intelligence reporting/analysis application 2, for example, issues queries to a data access component 4 in order to obtain data for its reports and analyses. Such queries make use of PMUNs 12 to identify business entities in order to remain data agnostic.

Internally, the data access component makes use of data source providers 16 to initially create PMUNs 12 for business entities that are returned as data to an application 2, which may, in turn produce queries that contain one or more of those PMUN values.

In order to execute a query, it is necessary for the data access component to make use of components such as a drill through manager 6 and a query execution module 8 to identify PMUN values within queries and, using the PMUN translation component 18, convert the PMUNs into values which may be used in the context of the data source against which the query is directed.

Reports are authored based on PMUNs 12. These PMUNs 12 are converted into Data source Specific Identifiers (DSIs) 14 as required. Applications 2 are unaware of the conversions between PMUNS 12 and DSIs 26.

In one embodiment, the invention includes three technologies: i) a portable, data agnostic MUN (PMUN) format, ii) a component that constructs PMUNs for both DMR and OLAP data sources, and iii) a component that translates source PMUNs into target PMUNs based on source and target metadata.

PMUN Format

Figure 2:
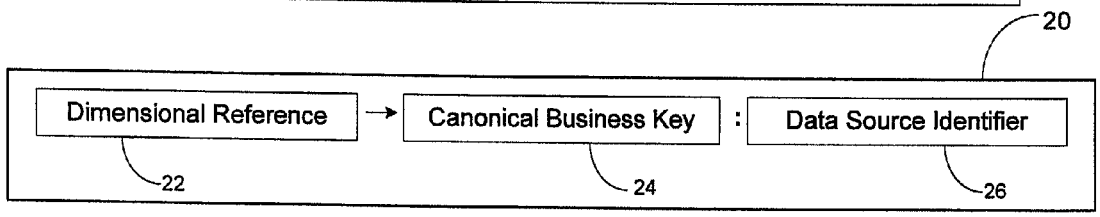
FIG. 2 shows in a diagram an example of a PMUN format, in accordance with an embodiment of the present invention.

FIG. 2 shows an example of a PMUN format 20, in accordance with an embodiment of the present invention. The PMUN format 20 is a representational structure for uniquely identifying members. The format comprises three parts:

Model Information (or dimensional reference) 22
Business Key (or canonical business key) 24
Data Source Specific Identifier (DSI) (or data source identifier) 26

In one embodiment, the first and second components of the PMUN format are separated by the text "->". The second and third components of the PMUN format are separated by a colon (":"). The first separator is always present, but the second separator is absent if the third portion of the PMUN is not present. Other notational formats may be used.

A data access component, which processes metadata and data queries posed by client applications, can obtain information about the second and/or third component of a PMUN by reading the first, model-based portion of the PMUN. Depending upon the data source technology, this information may be used to interpret the business keys and/or perform query planning.

Model Information 22

Each PMUN is associated with a particular data model type: a hierarchy, in the case of a parent/child hierarchy; or a level, in the case of a level based hierarchy. The Model Information portion 22 of the PMUN identifies the hierarchy or level from a logical model of the underlying data sources.

Preferably, individual components of the model identifier are enclosed by square braces, "[ and ]", and separated by a period ('.'). For example, a model identifier of a level may appear as:

[My Data Source].[Offices].[By Region].[Country]

PMUNs are created initially by a data source provider 18. Preferably, this model reference is the first part of the PMUN created for a particular business entity.

Business Key 24

Figure 3:
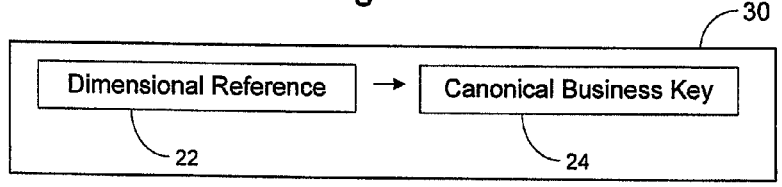
FIG. 3 shows in a diagram the components of a DMR PMUN, in accordance with an embodiment of a PMUN.

The second portion of a PMUN contains the list of business key values for a business entity and its ancestors, to at least the first unique level of identifier within a hierarchy that uniquely identifies a particular business entity. The multi-part business key is required for dimensionally modeled relational (DMR) data sources, and when performing certain PMUN conversions, but is optional for OLAP data sources. The presence of the multi-part business key ensures portability of a PMUN. FIG. 3 shows in a diagram the components of a DMR PMUN 30, in accordance with an embodiment of a PMUN.

Preferably, individual business key values are enclosed by square braces and separated by periods. For example, the multi-part key of for an office may appear as:

[USA].[North Region].[Seattle].[Office 121]

Business key values from left to right represent an ancestor/descendant relationship. It is this portion of a PMUN that ensures its portability.

In the case of DMR data sources, this portion contains the values of the columns that have been identified in the model as representing the business keys for the related business entities. If a business key value in this section is empty or null, an empty business key is added as "[]".

In the case of OLAP data sources, this portion represents the same list of business key values, where the values of the business key are obtained from the member properties of each particular data source provider that represent business key values. These values are obtained from the member and then its ancestors until the first unique level is encountered in the hierarchy in the same fashion as for DMR data sources.

The business key portion 24 of the PMUN is the canonical representation of a member that ensures portability of a PMUN across different data sources and across updates to a single data source. It is present for DMR data sources, but actual implementations may choose to not populate it for OLAP data sources, in which case the creation of the portable section is deferred until it is required to perform PMUN conversion. An implementation may also choose to not support OLAP to OLAP PMUN translation, in which case the PMUN conversion is not performed at all.

The Business Key section 24 is required for DMR data sources, but optional for OLAP data sources, though its presence ensures PMUN portability.

Data Source Specific Identifier 26

The optional third portion of a PMUN contains a DSI, typically a data source MUN from an OLAP provider, though this could also be an identifier from an arbitrary, metadata rich data source, such as an ERP system. Preferably, this portion of the PMUN comprises an identifier of the data source technology identifier enclosed in square braces followed by a period, and then the DSI. For example, the data source-specific identifier for an office in an OLAP data source may be represented as:

[BW].[Geography ByRegion].[121]

Preferably, the DSI is prefixed by a data source type to identify at a later time the origin of the data source DSI.

Figure 4:
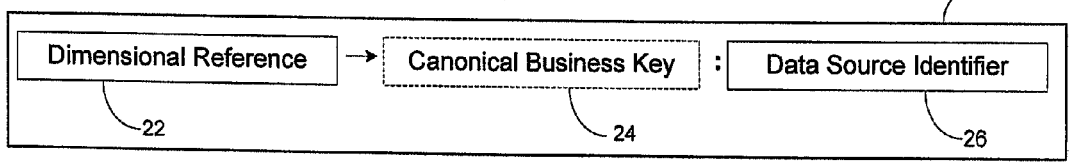
FIG. 4 shows in a component diagram an example of components of an OLAP PMUN, in accordance with an example of a PMUN.

FIG. 4 shows in a component diagram an example of components of an OLAP PMUN 40, in accordance with an example of a PMUN.

Construction and Conversion

Constructing a PMUN requires that a model exists of the dimensional data source on which the PMUN is posed. The model provides the ability to uniquely identify the following constructs within any underlying dimensional data source:

Data source
Dimension
Hierarchy
Level
Measure

Construction of a DMR PMUN

Figure 5:
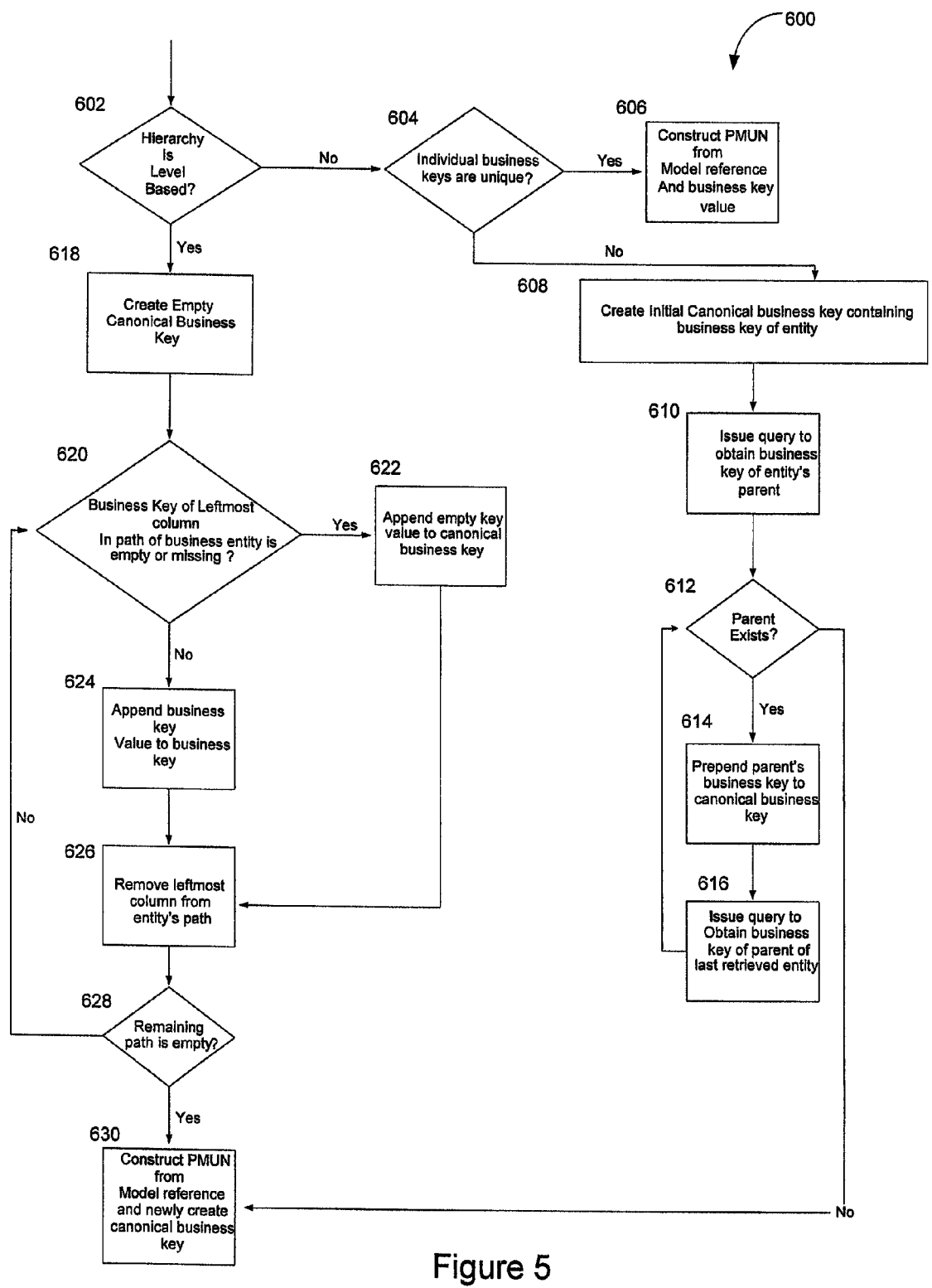
FIG. 5 shows in a flowchart an example of a method by which a DMR data source provider constructs a PMUN, in accordance with an embodiment of the present invention.

FIG. 5 shows in a flowchart an example of a method (600) by which a DMR data source provider constructs a PMUN 20, in accordance with an embodiment of the present invention. The method (600) comprises the following steps:

It is first determined if the hierarchy for which a PMUN is being created is level based (602). If the business keys of entities are unique with the hierarchy (604), a PMUN is constructed from the model reference and the business key value since this constitutes the canonical business key of the entity (606).

If the business keys are not unique (604), an initial canonical business key is constructed that contains the business key of the entity (608). A query is then issued to obtain the business key of the entity's parent in the hierarchy (610), If there is in fact a parent of the entity (612), the business key of the parent is pre-pended to the existing canonical business key being constructed (614). Another query is issued to obtain the parent of the last retrieved entity from the hierarchy (616). This process is repeated until (612) there is no parent to be retrieved, at which point a PMUN is constructed from the model reference and the canonical business key that has been constructed (630).

If the hierarchy is level based (602), an empty canonical business key is constructed (618).

If the left most column in the path of the DMR entity is empty (620), an empty key value is appended to the existing canonical business key being constructed (622). Otherwise (620), the key value is appended to the existing canonical business key (624).

In both cases (620), the left most column is removed from the DMR entity's path (626).

If the remaining path is empty (628), a PMUN is constructed from the model reference and the newly created canonical business key (630).

Otherwise (628), (620) is reevaluated for the next, left most column in the remaining entity path.

Construction of an OLAP PMUN

Figure 6:
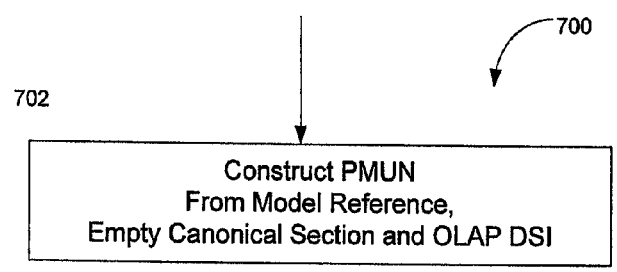
FIG. 6 shows in a flowchart an example of a method by which an OLAP data source provider creates an OLAP PMUN, in accordance with an embodiment of the present invention.

FIG. 6 shows in a flowchart an example of a method (700) by which an OLAP data source provider creates an OLAP PMUN 40, in accordance with an embodiment of the present invention.

An OLAP PMUN is constructed from the model reference, an empty canonical section, and the OLAP DSI of the business entity (702).

PMUN Translation Component 19

Referring back to FIG. 1, a PMUN Translation Component (PTC) 19 is employed to convert an input (source) PMUN to another (target) PMUN that is compatible with a specified target data source.

The PTC 19 examines a source PMUN and the data source to which the PMUN is being applied. If the two data sources are compatible, the source PMUN is compatible with the target data source, in which case the source PMUN is returned unaltered as the value of the target PMUN.

Otherwise, the PTC 19 employs a set of operations to convert the source PMUN into one that is appropriate for the target data source. The PMUN conversion component 19 also requires access to a model for each data source referenced by a PMUN.

In addition to the DMR and OLAP PMUN formats described earlier, the PTC supports a third PMUN format, called the Canonical PMUN. The Canonical PMUN format is constructed by the PTC when there is no target data source information available upon which to base the conversion. The PTC is also able to convert a Canonical PMUN (created earlier by the PTC) into a target PMUN, provided target data source information is available when conversion is attempted on the PMUN a second time. The Canonical PMUN can also be thought of as an intermediate form of PMUN and indeed appears as such in several of the PMUN translations described below.

Figure 7:
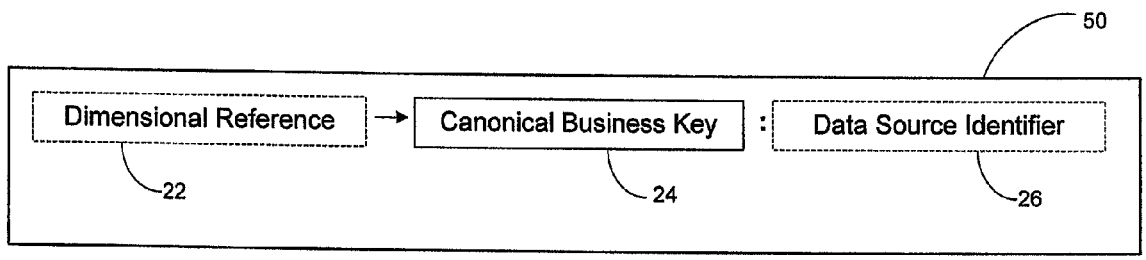
FIG. 7 shows in a component diagram an example of components of a Canonical PMUN, in accordance with an example of a PMUN.

FIG. 7 shows in a component diagram an example of components of a Canonical PMUN 50, in accordance with an example of a PMUN. A Canonical PMUN contains at least the second, canonical business key portion 24 and may contain, optionally one, or both of, the model reference 22 and OLAP DSI 26 sections. The more information contained within a Canonical PMUN, the more likely it is that when it must be converted into a data source specific PMUN that costly canonical translations can be avoided.

Data Source Providers 17

Referring back to FIG. 1, the PTC 19 uses a collection of data source providers 16 that accept both data and metadata queries containing PMUNs, in a format supported by the particular data source provider. A data source provider converts a supported PMUN into a DSI and vice versa.

A DMR data source provider accepts a PMUN that contains at least the first two sections of the PMUN format (model and business key sections, respectively) and ignores the DSI section, if present.

An OLAP data source provider accepts a PMUN that contains at least the first and third sections of the PMUN format (model and DSI, respectively) and ignores the business key section, if present.

Conversion Considerations

An entity's initial PMUN is first created, as described above, by a data source provider and is treated as a "black box" by components outside of the data access component. It is only within the data access component that a PMUN is actually parsed and evaluated. As a result, it is not possible for components outside of the data access component to author their own PMUNs.

The PTC 19 can convert a PMUN created for a particular data source into an equivalent PMUN for another data source that can be consumed by data source providers within the data access component. The equivalent PMUN remains within the data access component, thus relieving the need for applications to be aware of the MUN conversion process.

Implementation Criteria

In one embodiment of the present invention, for the PMUN conversions to succeed, the following criteria are preferably met:

Each business entity has a single, common business key.
Within a DMR data source, the columns that represent the business key for a business entity is identified as such in the model.
Within an OLAP database, the business key for a business entity is assigned to the property used for this purpose in each particular OLAP technology.
Hierarchies of business entities are identically constructed across data source technologies. That is, the parent/child relationships and ragged/unbalanced nature of the hierarchies are the same.

PMUN Conversions

In one embodiment of the present invention, the MUN translation component is capable of performing the following types of PMUN conversions, which are described in detail.

| Source PMUN | Target PMUN | Is Source/Target Technology the Same? | Target Model Required? |
|---|---|---|---|
| DMR | DMR | n/a | No |
| OLAP | OLAP | Yes | No |
| OLAP | OLAP | No | Yes |
| DMR | OLAP | n/a | No |
| OLAP | DMR | n/a | No. |
| DMR | Canonical | n/a | No |
| OLAP | Canonical | n/a | No |
| Canonical | OLAP | n/a | Yes |
| Canonical | DMR | n/a | Yes |

Validity of PMUN Translation

Preferably, The PTC 19 will translate a source PMUN into a target PMUN even when it is not provided with the information required to perform a valid translation. In such situations, the PTC 19 will generate a target PMUN that is of the correct format, but it may not necessarily be valid within the context of the target data source provider. In certain extreme circumstances when none of the information required to perform a translation is available, the PTC 19 will generate an error (exception).

These situations are discussed below in the context of each translation type.

General Translation Process

Figure 8:
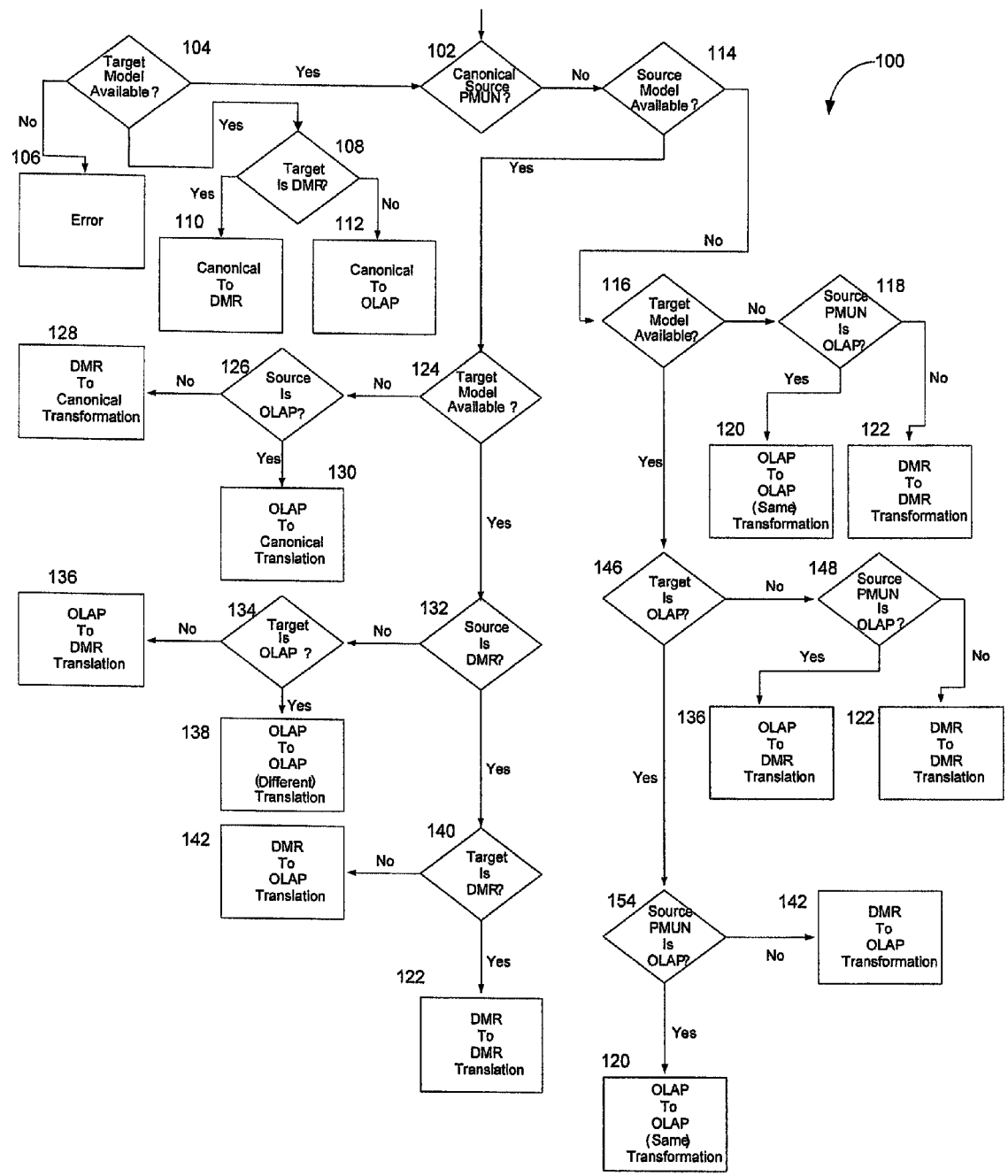
FIG. 8 shows in a flowchart an example of a method of choosing which PMUN translation to apply to a PMUN based on available information, in accordance with an embodiment of the present invention.

FIG. 8 shows in a flowchart an example of a method of choosing which PMUN translation to apply to a PMUN based on available information (100), in accordance with an embodiment of the present invention.

The first step (102) of PMUN translation is to determine if the source PMUN contains the canonical portion. If it does not, then it is necessary to check if the target model is available (104). If not, then an error is raised (106) since there is insufficient information upon which to perform a PMUN translation. Otherwise (108), if the target is DMR (110), a canonical to DMR translation is performed, otherwise if the target is OLAP (112), a canonical to OLAP translation is performed.

If at (102) the canonical portion of the PMUN is not available, it is determined (114) if the source model is available. If it is not, then is determined (116) if the target model is available. If not, then the type of source PMUN is determined (118) and if OLAP, an OLAP to OLAP same technology translation (120) is performed, though this may be incorrect if in fact the OLAP technologies are different. If the source PMUN type is DMR, then a DMR to DMR translation (122) is performed.

If at (116) it is determined that the target model is available, and if the target is OLAP (146), and if the source PMUN is OLAP (148), an OLAP to DMR translation is performed (136), otherwise if at (148) it is determined that the source PMUN is DMR, a DMR to DMR translation (122) is performed.

If at (146) is determined that the target is OLAP, and if the source PMUN is OLAP (154), then an OLAP to OLAP same technology transformation (120) is performed. However, if at (154) the source PMUN is determined to be DMR, then a DMR to DMR translation (142) is performed.

If, at (114) it is determined that the source model information is available, then a check is made (124) if the target model information is available. If not, then if the source PMUN is OLAP (126) an OLAP to canonical translation (130) is performed, otherwise a DMR to canonical translation (128) is performed.

If at (124) it is determined that the target model information is available, then the type of source PMUN is determined (132). If DMR, then it is determined if the source model is DMR (140) and if so, a DMR to DMR translation (122) is performed.

If at (140) the target is identified as OLAP, then a DMR to OLAP translation is performed (142).

If at (132) the source type is identified as OLAP, then it is determined if the target is OLAP (134) and if it is, then an OLAP to OLAP different technology translation is performed (138).

If at (134) the target is identified as DMR, then an OLAP to DMR translation is performed (136).

DMR to DMR

Figure 9:
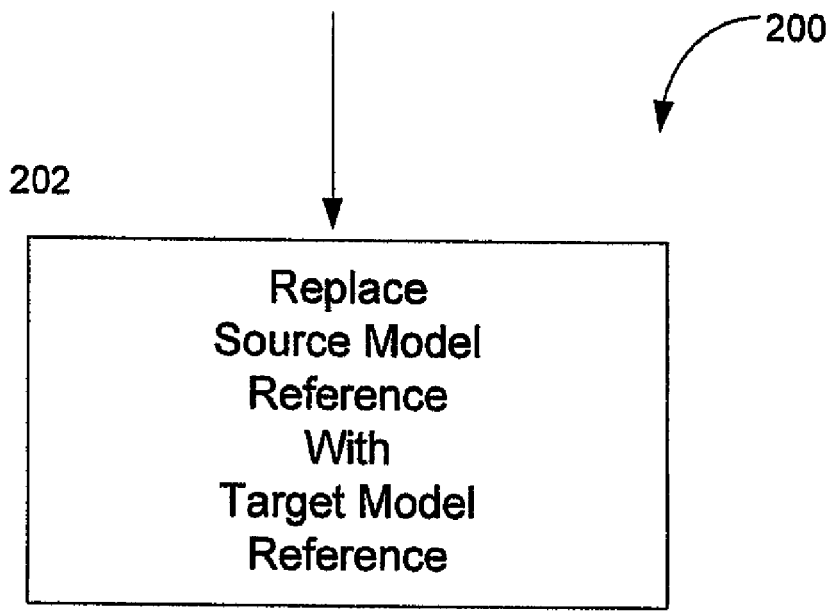
FIG. 9 shows in a flowchart an example of a method of DMR to DMR PMUN translation, in accordance with an embodiment of the present invention.

FIG. 9 shows in a flowchart an example of a method of DMR to DMR PMUN translation (200), in accordance with an embodiment of the present invention.

A PMUN created from a DMR data source contains a model reference and the list of business key values that correspond to a particular member. If the target data source is another DMR data source, then the underlying data source provider accepts the same form of a PMUN, regardless of the relational data base technology. To complete the PMUN translation, the source model reference portion of the source PMUN is replaced with that of the target model reference supplied as a parameter value to the PTC (202).

If the target model is not available to the PMUN translation module, this translation is still correct if the target data source is DMR since an underlying requirement is that the business key values representation are consistent across DMR data sources.

OLAP to OLAP (Same Technology)

Figure 10:
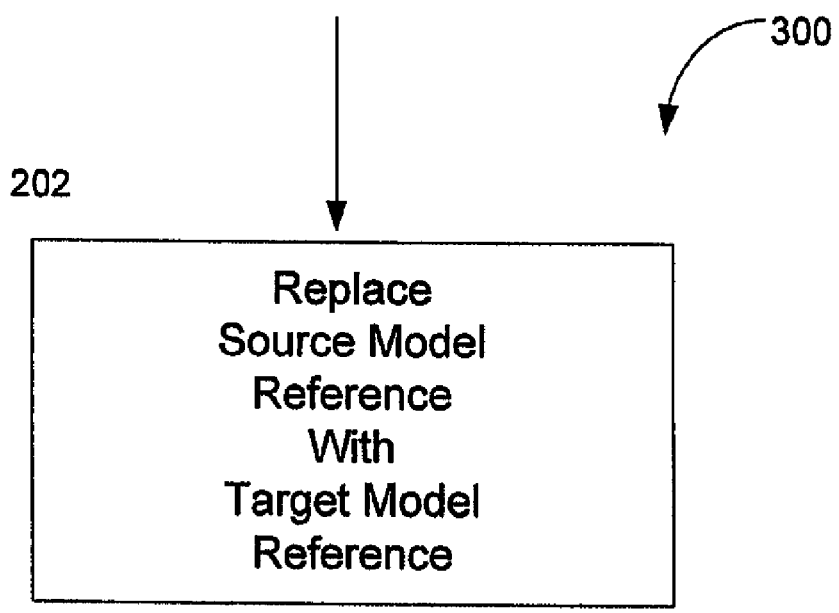
FIG. 10 shows in a flowchart an example of a method of OLAP to OLAP same technology PMUN translation, in accordance with an embodiment of the present invention.

FIG. 10 shows in a flowchart an example of a method of OLAP to OLAP same technology PMUN translation (300), in accordance with an embodiment of the present invention.

If the source PMUN is from an OLAP data source and the target dimensional reference corresponds to an OLAP data source, the PMUN translation component creates a target PMUN by replacing the model reference portion of the source PMUN with that of the model reference supplied as a parameter value to the PMUN translation component (202).

If the target model is not available to the PMUN translation module, this translation is still correct if the target data sources are of the same data source technology because the DSIs are identical based on the data warehouse requirements stated earlier. Otherwise, this translation may produce an invalid OLAP PMUN.

OLAP to OLAP (Different Technology)

Figure 11:
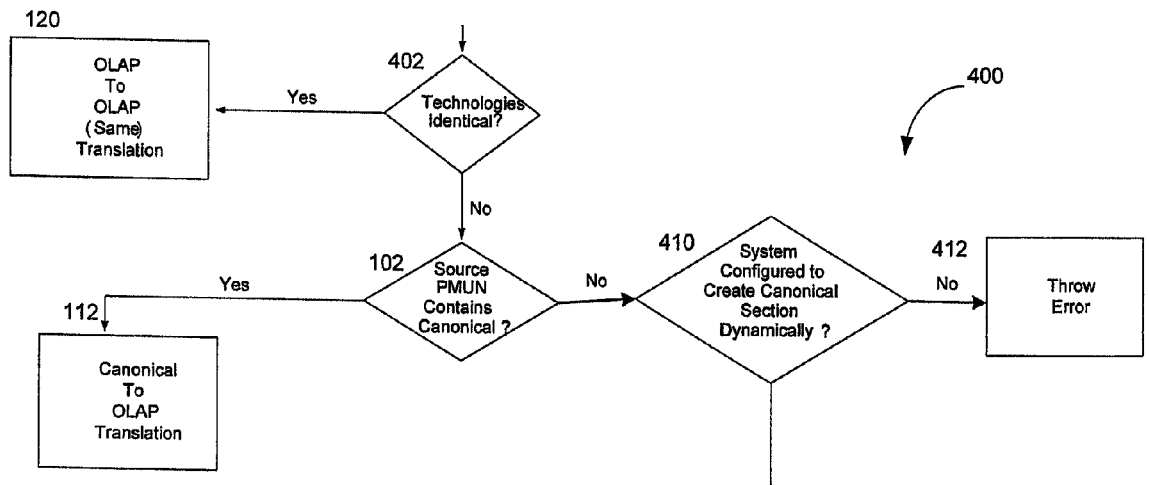
FIG. 11 shows in a flowchart an example of a method of OLAP to OLAP different technology, in accordance with an embodiment of the present invention.

FIG. 11 shows in a flowchart an example of a method of OLAP to OLAP different technology (400), in accordance with an embodiment of the present invention.

A check is first performed to see if the source and target data sources are of the same technologies (402). This check is possible since this translation is only invoked if both the source and target model information are available. If the technologies are the same, then the OLAP to OLAP same technology translation (120) is invoked to perform the PMUN translation.

Otherwise (402), the source PMUN is searched to determined if it contains the canonical portion (102) and if it does, then a canonical to OLAP translation (112) is performed.

Otherwise (102), it is determined if the system is configured to perform dynamic canonic PMUN section creation (410). If not, then an error is raised (412). Otherwise (410), the source PMUN is translated in canonical form (130) and this is in turn translated into an OLAP PMUN (416).

DMR to OLAP

Figure 12:
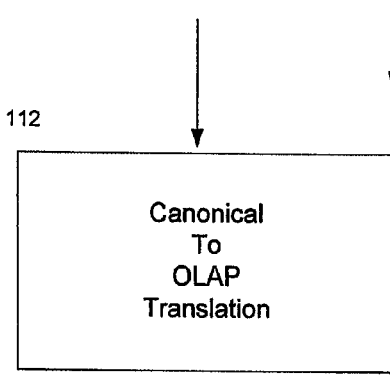
FIG. 12 shows in a flowchart an example of a method of DMR to OLAP translation, in accordance with an embodiment of the present invention.

FIG. 12 shows in a flowchart an example of a method of DMR to OLAP translation (450), in accordance with an embodiment of the present invention.

A PMUN created from a DMR data source contains the canonical business key section required to construct an OLAP PMUN, hence a canonical to OLAP translation is performed upon the source PMUN (112).

If the target model is not available to the PMUN translation module, this translation is still correct since the target PMUN contains its canonical section.

OLAP to DMR

Figure 13:
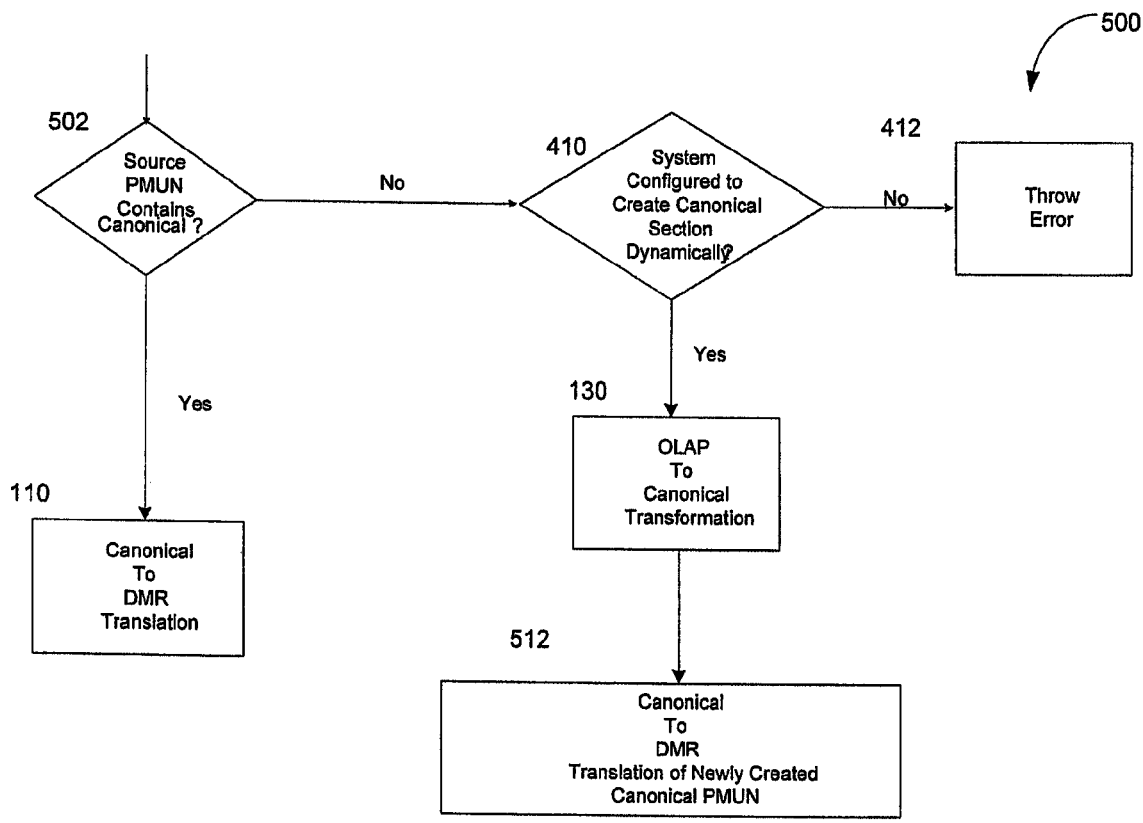
FIG. 13 shows in a flowchart an example of a method of OLAP to DMR translation, in accordance with an embodiment of the present invention.

FIG. 13 shows in a flowchart an example of a method of OLAP to DMR translation (500), in accordance with an embodiment of the present invention.

If the source PMUN contains the canonical section (502), a canonical to DMR translation is performed on the source PMUN (110).

However (502) if the source PMUN does not contain the canonical section, then it is determined if the system is configured to dynamically create canonical PMUN sections (410). If not, then an error is raised (412). However (410) if dynamic creation of PMUN canonical sections is supported, an OLAP to canonical translation (130) is applied to the source PMUN and a canonical to DMR translation (512) is in turn applied to the newly created canonical PMUN.

DMR to Canonical

Figure 14:
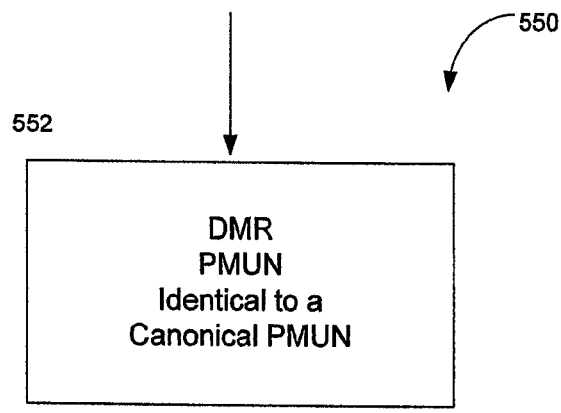
FIG. 14 shows in a flowchart an example of a method of DMR to canonical translation, in accordance with an embodiment of the present invention.

FIG. 14 shows in a flowchart an example of a method of DMR to canonical translation (550), in accordance with an embodiment of the present invention.

Since a DMR PMUN contains a canonical section, it is already in canonical format and requires no translation (552).

OLAP to Canonical

Figure 15:
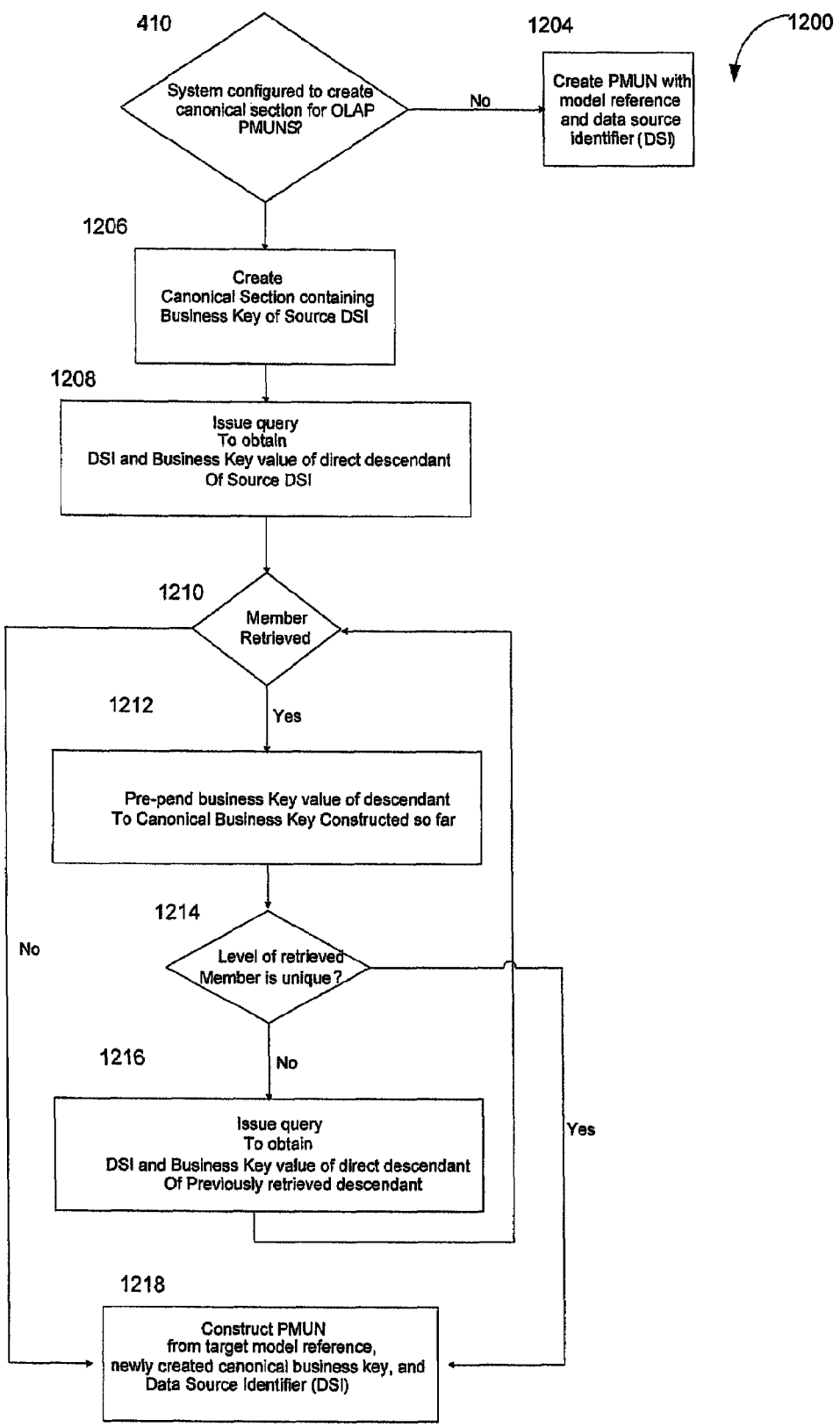
FIG. 15 shows in a flowchart an example of a method of OLAP to canonical translation, in accordance with an embodiment of the present invention.

FIG. 15 shows in a flowchart an example of a method of OLAP to canonical translation (1200), in accordance with an embodiment of the present invention.

If the system is not enabled to dynamically create canonical sections in PMUNs (410), then a PMUN is created using the target model reference and the source DSI (1204). This PMUN in this case is a same technology PMUN, not a canonical PMUN and is limited in its applicability.

Otherwise (410), a canonical section is created that contains the business key of the entity identified by the DSI (1206).

A query is then issued against the source data source to obtain the DSI and business key of the direct ancestor of the entity identified by the source PMUN (1208). If no data (DSI and business key) is returned by this query (1210), then a target PMUN is created from the target model reference, the newly created canonical section, and the source DSI (1218). The source DSI is retained in the generated PMUN to avoid future dynamic translations that can be avoided when performing translations to the same technology OLAP.

Otherwise (1210), the business key of the ancestor DSI is pre-pended to the current canonical section as per the format of the canonical section (1212).

If the level at which the ancestor was retrieved uniquely identifies members within a hierarchy (1214), then a target PMUN is created from the target model reference, the newly created canonical section, and the source DSI (1218).

However (1214) the level does not uniquely identify members, another query is performed to obtain the ancestor of the last retrieved DSI (1216). The condition at (1210) is again evaluated.

Canonical to DMR

Figure 16:
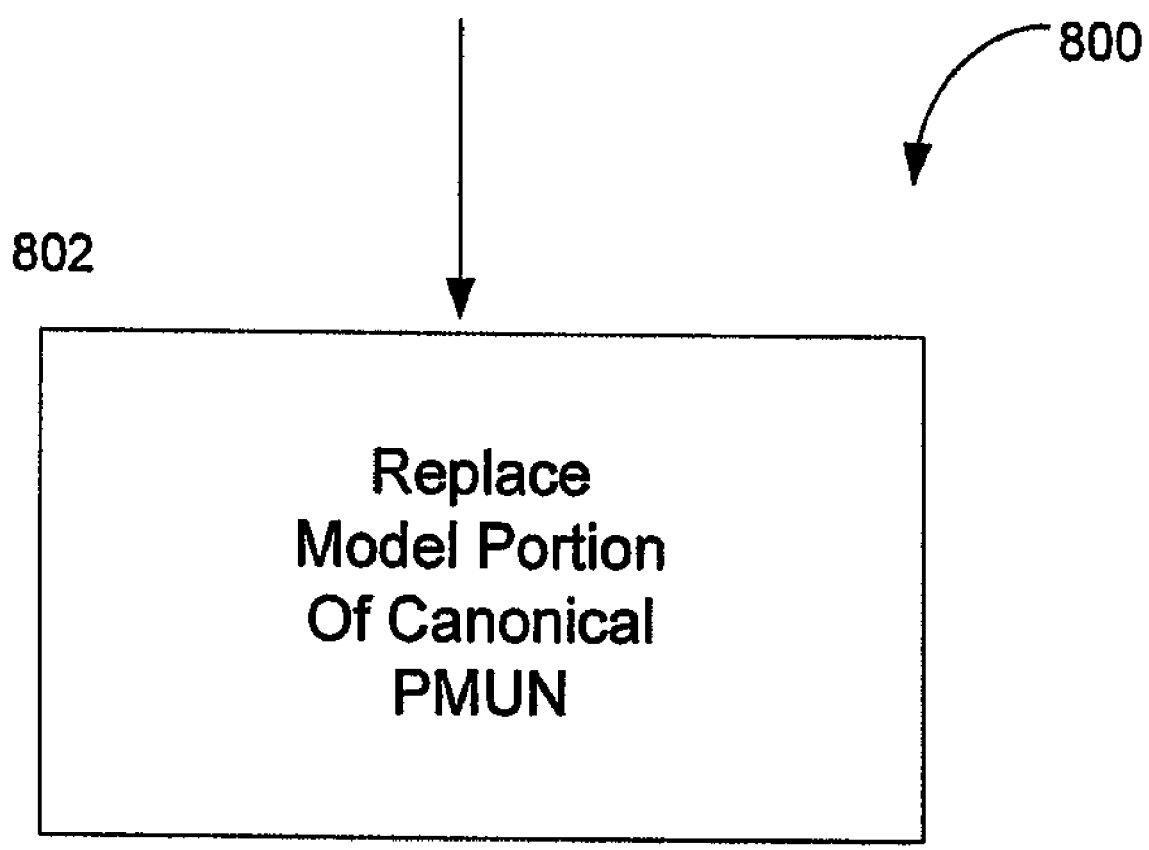
FIG. 16 shows in a flowchart the method of canonical to DMR translation, in accordance with an embodiment of the present invention.

FIG. 16 shows in a flowchart the method of canonical to DMR translation (800), in accordance with an embodiment of the present invention.

A DMR PMUN contains a canonical section, so to convert a canonical PMUN to an OLAP PMUN, the model portion of the source PMUN is replaced with the target model reference (802).

Canonical to OLAP

Figure 17:
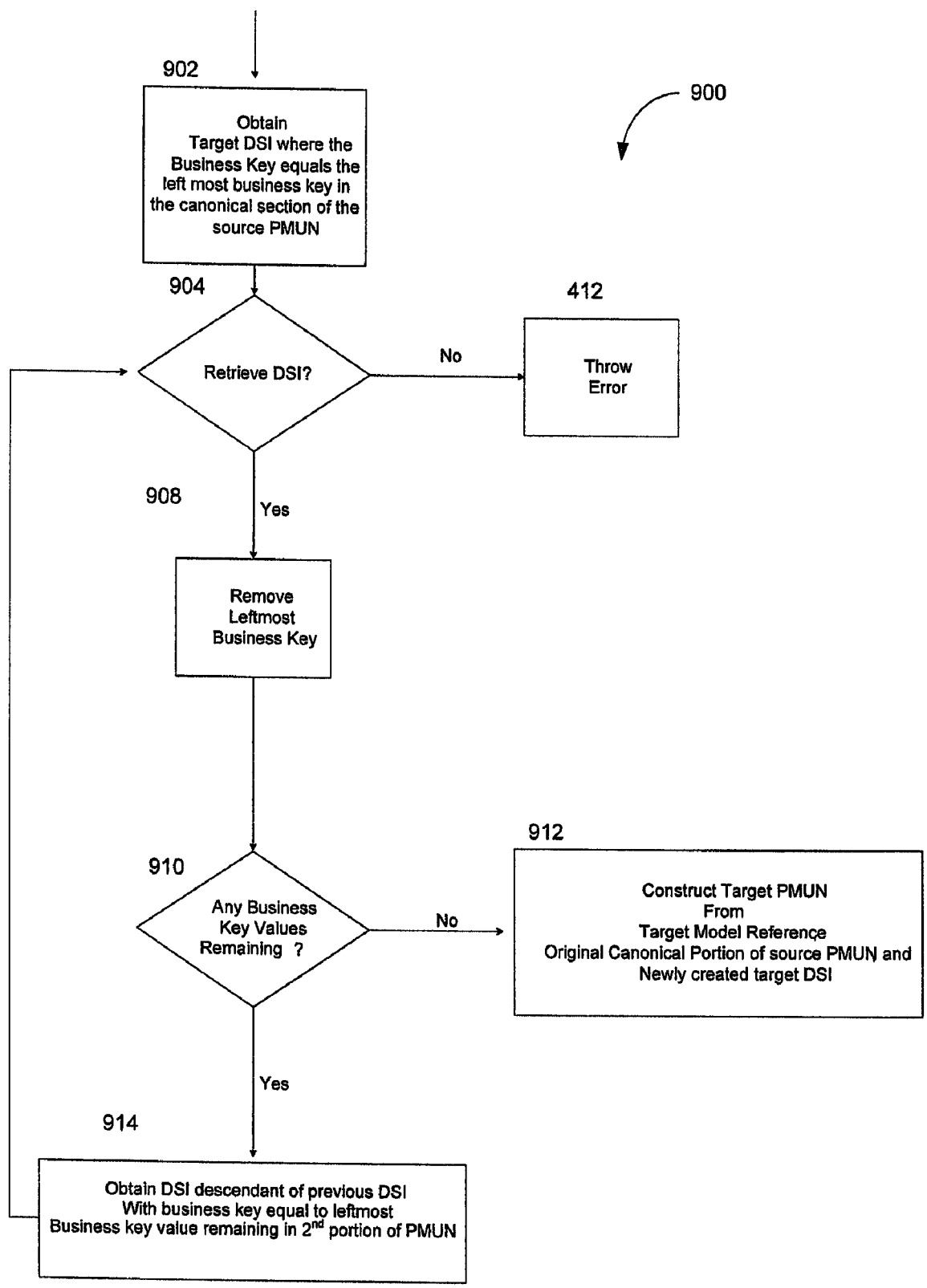
FIG. 17 shows in a flowchart the method of canonical to OLAP translation (900), in accordance with an embodiment of the present invention.

FIG. 17 shows in a flowchart the method of canonical to OLAP translation (900), in accordance with an embodiment of the present invention.

A query is posed to the target data source to retrieve the DSI that has a business key equal to the left most portion of the canonical section of the source PMUN (902). If no DSI is retrieved (904), an error is thrown (412) since there is no DSI that matches the supplied business key.

However (904), if a DSI is obtained, the left most portion of the canonical section of the source PMUN is removed (908).

If there is text remaining in the canonical section of the source PMUN (910), an OLAP PMUN is constructed from the target model reference, the original canonical section of the source PMUN, and the DSI retrieved from the last query issued to the target data source (912).

If (910) there is remaining text in the canonical section of the source PMUN, another query is issued to the target data source to obtain the DSI associated with the left most identifier in the remaining text of the canonical section of the source PMUN (914).

Again, (904) is evaluated.

Master/Detail Reports

Figure 18:
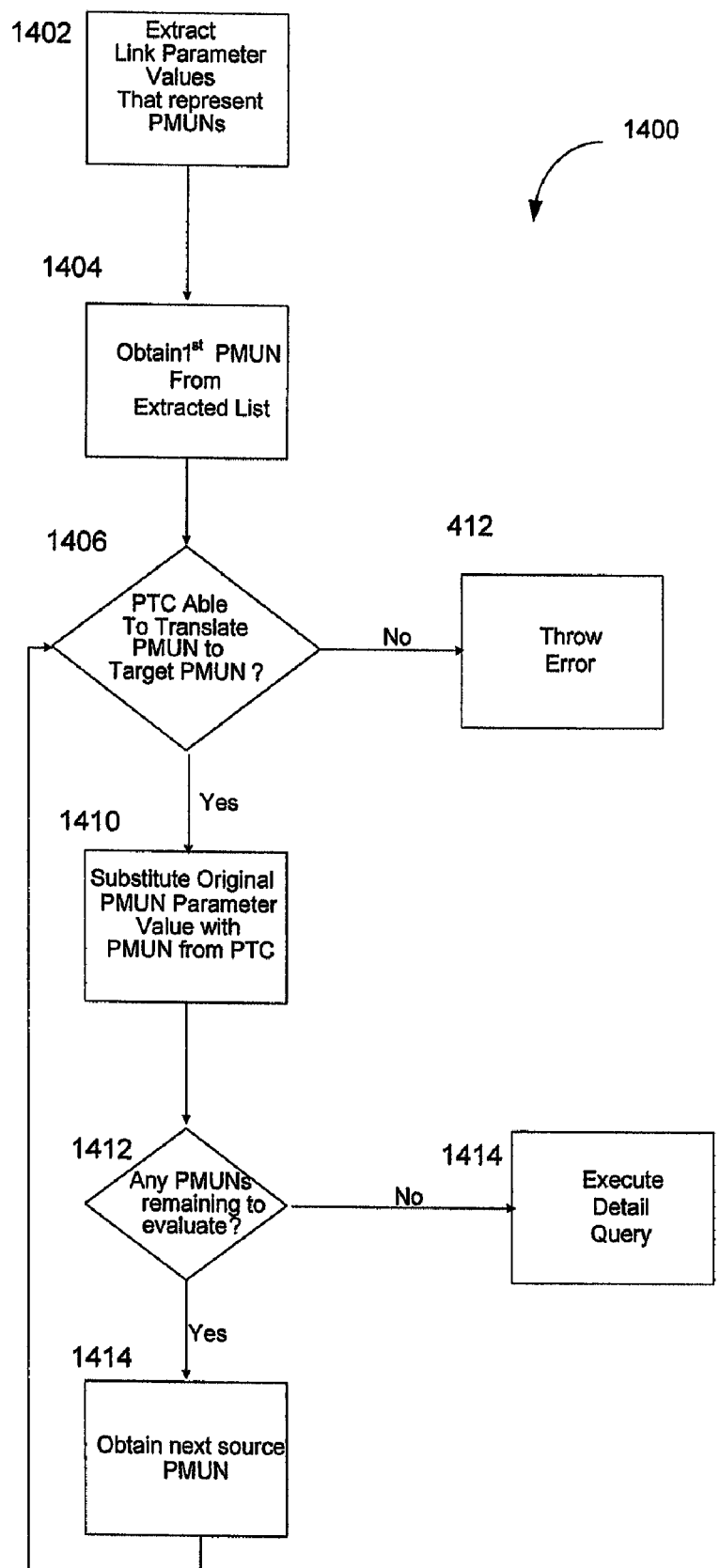
FIG. 18 shows in a flowchart an example of a method applied to perform PMUN translation in the realm of master/detail reports, in accordance with an embodiment of the present invention.

FIG. 18 shows in a flowchart an example of a method applied to perform PMUN translation in the realm of master/detail reports (1400), in accordance with an embodiment of the present invention.

When the detail query is executed, a sub-component of the data access component, that is not part of the current invention, extracts all the master query's parameter values that represent PMUNs (1402).

The first PMUN from the list of PMUNs extracted from the parameter list is obtained (1404). If the PTC is able to convert the source parameter PMUN value to a target PMUN based upon the target model and data source to which the query is being applied (1406), the original PMUN value in the parameter list is substituted with the newly constructed PMUN returned by the PTC (1510). Otherwise (1406), an error is thrown (412).

If a PMUN substitution has occurred (1410), a check is made for any remaining PMUNs that require translation (1412). If there are more, the next source PMUN is obtained from the list (1414). The PMUN is then sent to the PTC for translation (1406).

If there are no more PMUNs to be translated (1412), the detail query is executed (1414) since all of the PMUNs in the original parameter list have been translated into a format consumable by the target data source.

Query Execution

Figure 19:
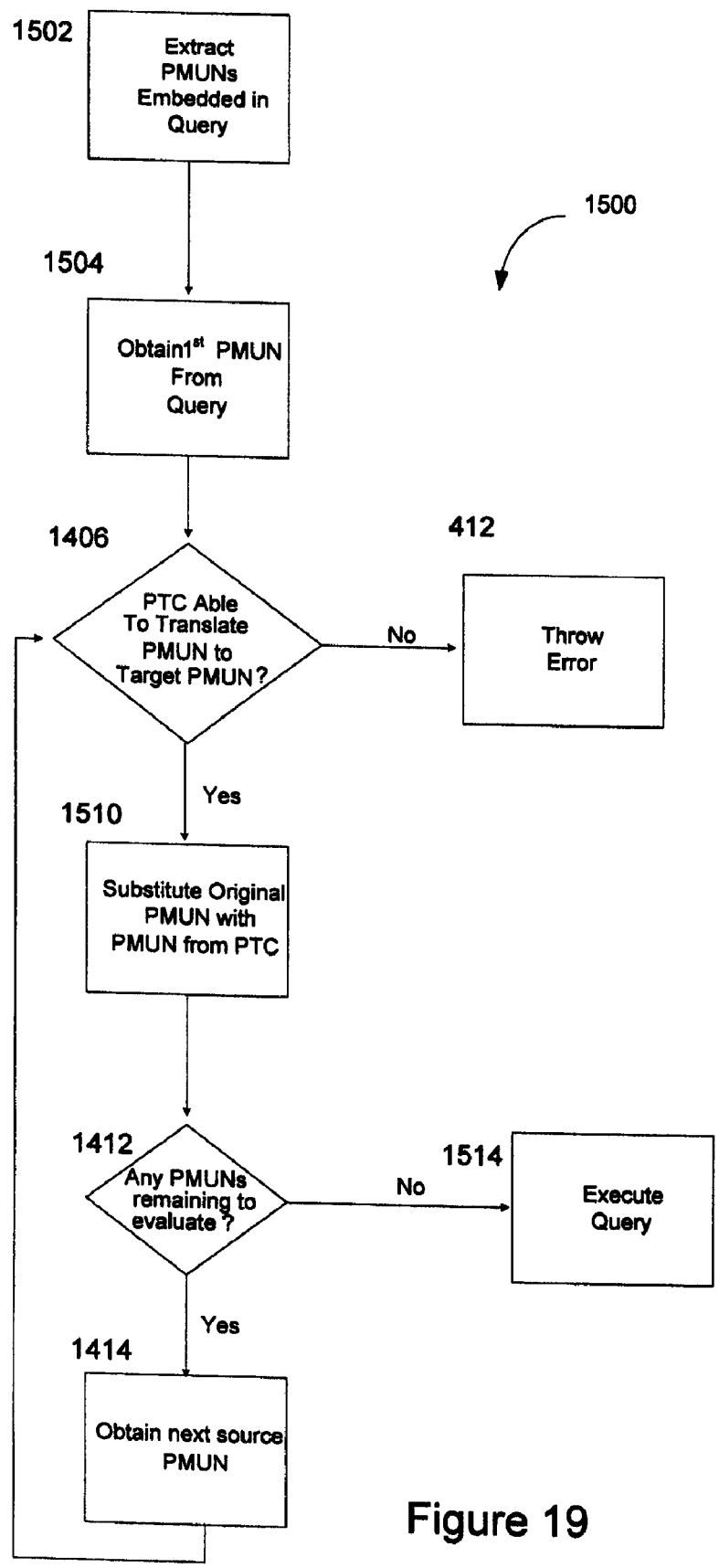
FIG. 19 shows in a flowchart an example of a method applied by the query execution component to translate PMUNs to enable query execution independent of the data source or technology upon which a report PMUN is based, in accordance with an embodiment of the present invention.

FIG. 19 shows in a flowchart an example of a method applied by the query execution component to translate PMUNs to enable query execution independent of the data source or technology upon which a report PMUN is based (1500), in accordance with an embodiment of the present invention.

When a query is executed, a sub-component of the data access component, that is not part of the current invention, extracts all of the source PMUNs embedded within the query (1502).

The first PMUN from the list of PMUNs extracted from the query is obtained (1504). If the PTC is able to convert the source (query) PMUN to a target PMUN based upon the target model and data source to which the query is being applied (1506), the original PMUN in the query is substituted with the newly constructed PMUN returned by the PTC (1510). Otherwise (1406), an error is thrown (412).

If a PMUN substitution has occurred (1510), a check is made for any remaining PMUNs that require translation (1412). If there are more, the next source PMUN is obtained from the list (1414). The PMUN is then sent to the PTC for translation (1406).

If there are no more PMUNs to be translated (1412), the query is executed (1414) since all of the PMUNs in the original query have been translated into a format consumable by the target data source.

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A member unique name (MUN) translation system for translating a dimensional member reference in a first report to a dimensional member reference in a second report, the MUN translation system comprising:

a processor;

a computer-readable storage medium encoded with instructions for a translation selection module and a collection of MUN transformations;

wherein the processor is configured to execute the translation selection module to select a MUN transformation from the collection of MUN transformations, wherein to select the MUN transformation, the processor is configured to receive a source report dimensional member reference and a target report dimensional member reference and select the MUN transformation based upon a source model type associated with the source dimensional member reference and a target model type associated with the target dimensional member reference;

wherein the processor is configured to execute the selected MUN transformation to transform a MUN structure of a first data source into a MUN structure of a second data source, and wherein the collection of MUN transformations comprises at least one of:

a different source technology OLAP to OLAP transformation for causing the processor to transform a third OLAP MUN to a fourth OLAP MUN, the third OLAP MUN and fourth OLAP MUN being of different source technologies; and a dimensional modeled relational (DMR) to OLAP transformation for causing the processor to transform a DMR MUN to an OLAP MUN.

2. The MUN translation system of claim 1, wherein the collection of MUN transformations further comprises one or more of:

a DMR to DMR transformation for causing the processor to transform a first dimensionally modeled relational (DMR) MUN to a second DMR MUN;

a same source technology OLAP to OLAP transformation for causing the processor to transform a first OLAP MUN to a second OLAP MUN, the first OLAP MUN and second OLAP MUN being of the same source technology;

an OLAP to DMR transformation for causing the processor to transform an OLAP MUN to a DMR MUN;

a DMR to canonical transformation for causing the processor to transform a DMR MUN into a MUN containing a dimensional reference and a canonical business key; and an OLAP to canonical transformation for causing the processor to transform an OLAP MUN into a MUN containing a dimensional reference and a canonical business key.

3. A method of translating a dimensional member reference in a first report to a dimensional member reference in a second report, the method comprising:

selecting, by a computing device, a MUN transformation from a collection of MUN transformations, wherein selecting the MUN transformation comprises:

receiving a source report dimensional member reference and a target report dimensional member reference; and selecting the MUN transformation based upon:

a source model type associated with the source dimensional member reference; and a target model type associated with the target dimensional member reference; and transforming, by the computing device, a MUN of a first data source into a MUN of the second data source according to the selected MUN transformation, wherein transforming comprises at least one of:

transforming, by the computing device, a first OLAP MUN to a second OLAP MUN, the first OLAP MUN and second OLAP MUN being of different source technologies; or transforming, by the computing device, a dimensional modeled relational (DMR) MUN to an OLAP MUN.

4. The method of claim 3, wherein selecting the MUN transformation comprises:

selecting a different source OLAP to OLAP transformation when the underlying data source of both of the source model and target model are OLAP from different source data types; and selecting a DMR to OLAP transformation when the underlying data source of the source model is DMR and the underlying data source of the target model is OLAP.

5. The method of claim 3, wherein transforming further comprises one or more of:

transforming a first dimensionally modeled relational (DMR) MUN to a second DMR MUN;

transforming a third OLAP MUN to a fourth OLAP MUN, the third OLAP MUN and fourth OLAP MUN being of the same source technology;

transforming an OLAP MUN to a DMR MUN;

transforming a DMR MUN into a MUN containing a dimensional reference and a canonical business key; and transforming an OLAP MUN into a MUN containing a dimensional reference and a canonical business key.

6. The method of claim 5, wherein the MUN transformation is one of:

an OLAP to canonical transformation for when the underlying data source of the source model is OLAP and the underlying data source of the target model is unknown;

a DMR to canonical transformation for when the underlying data source of the source model is DMR and the underlying data source of the target model is unknown;

a DMR to DMR transformation for when the underlying data source of both the source model and target model are DMR;

a same source OLAP to OLAP transformation for when the underlying data source of both of the source model and target model are OLAP from the same source data type;

a different source OLAP to OLAP transformation for when the underlying data source of both of the source model and target model are OLAP from different source data types;

a DMR to OLAP transformation for when the underlying data source of the source model is DMR and the underlying data source of the target model is OLAP; and an OLAP to DMR transformation for when the underlying data source of the source model is OLAP and the underlying data source of the target model is DMR.

7. A computer-readable storage medium encoded with executable instructions for causing a programmable processor to:

select a MUN transformation, wherein the instructions to select the MUN transformation comprise instructions to:

receive a source report dimensional member reference and a target report dimensional member reference; and select the MUN transformation based upon:

a source model type associated with the source dimensional member reference; and a target model type associated with the target dimensional member reference; and transform a MUN of a first data source into a MUN of a second data source, the instructions to transform comprising at least one of:

instructions to transform a first OLAP MUN to a second OLAP MUN, the first OLAP MUN and second OLAP MUN being of different source technologies; or instructions to transform a DMR MUN to an OLAP MUN.

8. The computer-readable storage medium of claim 7, wherein the instructions to select the MUN transformation comprise instructions to:

select a different source OLAP to OLAP transformation when the underlying data source of both of the source model and target model are OLAP from different source data types; and select a DMR to OLAP transformation when the underlying data source of the source model is DMR and the underlying data source of the target model is OLAP.

9. The computer-readable storage medium of claim 7, wherein the collection of MUN transformations comprises one or more of instructions to:

transform a first dimensionally modeled relational (DMR) MUN to a second DMR MUN;

transform a third OLAP MUN to a fourth OLAP MUN, the third OLAP MUN and fourth OLAP MUN being of the same source technology;

transform an OLAP MUN to a DMR MUN;

transform a DMR MUN into a MUN containing a dimensional reference and a canonical business key; and transform an OLAP MUN into a MUN containing a dimensional reference and a canonical business key.

10. The computer-readable storage medium of claim 7, wherein the collection of MUN transformations comprises one or more of:

an OLAP to canonical transformation for when the underlying data source of the source model is OLAP and the underlying data source of the target model is unknown;

a DMR to canonical transformation for when the underlying data source of the source model is DMR and the underlying data source of the target model is unknown;

a DMR to DMR transformation for when the underlying data source of both the source model and target model are DMR;

a same source OLAP to OLAP transformation for when the underlying data source of both of the source model and target model are OLAP from the same source data type;

a different source OLAP to OLAP transformation for when the underlying data source of both of the source model and target model are OLAP from different source data types;

a DMR to OLAP transformation for when the underlying data source of the source model is DMR and the underlying data source of the target model is OLAP; and an OLAP to DMR transformation for when the underlying data source of the source model is OLAP and the underlying data source of the target model is DMR.

* * * * *